United States Patent [19]

Von Musil et al.

[11] 4,070,593

[45] Jan. 24, 1978

[54] EXCITATION WINDING ARRANGEMENT FOR A SYNCHRONOUS ELECTRIC MACHINE

[75] Inventors: Rudolf Von Musil; Ingolf Schmidt; Franz Spirk, all of Berlin, Germany

[73] Assignee: Siemens Aktiengesellschaft, Munich, Germany

[21] Appl. No.: 698,533

[22] Filed: June 22, 1976

Related U.S. Application Data

[63] Continuation of Ser. No. 537,373, Dec. 20, 1974, abandoned.

[30] Foreign Application Priority Data

Jan. 31, 1974 Germany ............................ 2405148

[51] Int. Cl.² ............................................. H02K 1/24
[52] U.S. Cl. .................................. 310/194; 310/180; 310/218; 310/269
[58] Field of Search ............... 310/43, 194, 22 F, 218, 310/180, 269, 270, 60 A

[56] References Cited

U.S. PATENT DOCUMENTS

| 556,891 | 3/1896 | Lamme | 310/194 |
| 896,321 | 8/1908 | Reist | 310/269 |
| 1,368,350 | 2/1921 | Prugger | 310/270 |
| 2,473,842 | 6/1949 | Askey | 310/43 |
| 2,756,358 | 7/1956 | Johnson | 310/60 A |

*Primary Examiner*—Donovan F. Duggan
*Attorney, Agent, or Firm*—Kenyon & Kenyon, Reilly, Carr & Chapin

[57] ABSTRACT

An excitation winding arrangement is provided for low-speed synchronous machines wherein the poles are configured without pole shoes and accommodate the excitation windings. The excitation winding arrangement includes coils of flat conductors which define the excitation windings. The flat conductors are wound so that their surfaces are parallel to the walls of the poles and the coils form a self-supporting component which can be improved by hardened turn insulation. These coils are secured only at the end-faces of the poles by a mounting arrangement. Effective cooling of the coils in the pole gap is thereby achieved.

8 Claims, 3 Drawing Figures

EXCITATION WINDING ARRANGEMENT FOR A SYNCHRONOUS ELECTRIC MACHINE

This is a continuation of application Ser. No. 537,373, filed Dec. 20, 1974, now abandoned.

BACKGROUND OF THE INVENTION

In synchronous electric machines, the salient poles in the rotor, which carry the excitation winding, can be configured without pole shoes. In this connection, reference may be had to *Leitfaden der Elektrotechnik* by Moeller-Werr, Vol. III, 3.ed., page 42. With this configuration, there is obtained a pole gap of approximately rectangular shape wherein the excitation windings can be put in place very simply in the radial direction. The excitation winding fills the pole gaps practically completely and is held in place by slot wedges. This, however, means that the removal of the heat generated in the excitation windings by air cooling cannot be effected at least in the region of the pole gaps.

It is an object of the invention to provide an excitation winding arrangement wherein the advantage of simple mounting of the excitation winding in the radial direction in a synchronous electric machine is retained and nevertheless an effective cooling of the excitation winding by air achieved.

SUMMARY OF THE INVENTION

The above object of the invention is realized with the excitation winding arrangement according to the invention for a synchronous electric machine equipped with salient poles at the rotor which carry the excitation windings and are constructed without pole shoes. The excitation winding arrangement according to the invention includes coils made of flat electric conductors having only turns insulation and having surfaces which are parallel to the walls of the poles and form a self-supporting structural member. The coils are secured only at the end-faces of the poles by a mounting connected with the poles, that is, with the rotor body. By winding the flat conductors on edge, the coils of the excitation winding are given very great stiffness so that they form a self-supporting structural unit for which a mounting provided only at the end-faces of the poles is completely sufficient for securing it mechanically, as long as the synchronous electric machine is a low-speed machine. The coils, which are equipped only with turn insulation but not with an outer insulation, therefore lie completely exposed in the pole gaps in the air flowing there. This arrangement achieves, however, the effective removal of the dissipation heat generated in the coils during the operation of the machine.

To improve the cooling of the coils, it is furthermore advisable to construct the mounting arrangement so that it keeps the coils at a spacing from the lateral surfaces of the poles. In addition, the heat-emitting area of the coils at the end-faces thereof can further be increased by providing the flat conductors forming the coil with a profile defining a cooling fin at least at one narrow face.

Although the invention is illustrated and described herein as an excitation winding arrangement for a synchronous electric machine, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
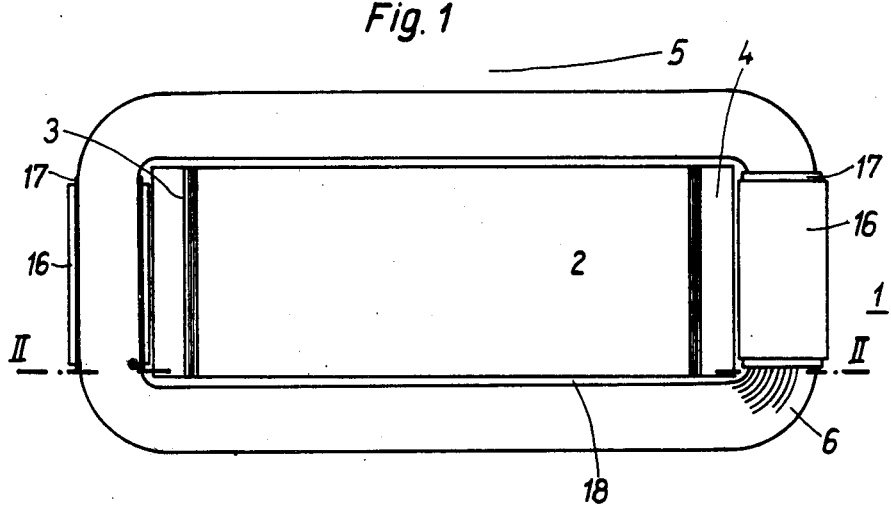
FIG. 1 is a schematic diagram showing a plan view of a pole equipped with the excitation winding arrangement according to the invention. The view shows coils of the excitation winding disposed in surrounding relation to the pole.
Figure 2:
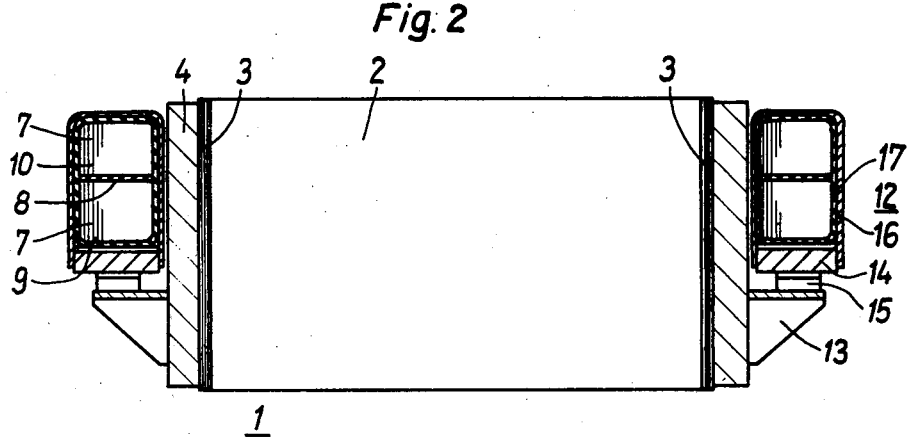
FIG. 2 is an elevation view of the pole of FIG. 1 with a section taken along the line II—II of FIG. 1.
Figure 3:
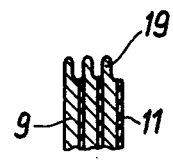
FIG. 3 is a fragmentary view, in section and greatly enlarged, of a coil of the excitation winding and illustrates how the flat conductor of a coil can be configured to define a cooling fin.

The rotor of a synchronous electric machine of low rotational speed is provided with laminated excitation poles of which the pole 2 shown in the drawing is representative. The poles 2 are provided with end-plates 4 at their end-faces 3 and have no pole shoes. Thus, the laminations forming the pole 2 as well as the pole gaps 5 have approximately rectangular shape. This affords the advantage that the excitation windings 6 surrounding each pole 2 can be installed and removed in the radial direction in the simplest manner.

Each excitation winding 6 of a pole 2 includes two coils 7 which are arranged one on top of the other in the radial direction of the rotor and between which insulation 8 is disposed. In this way, a larger number of turns for the excitation winding 6 is obtained so that the excitation current required is smaller. Each coil 7 is wound from flat conductors 9 of copper so that the surfaces 10 of the flat conductors 9 are parallel to the walls of the poles 2. This means that the flat conductors 9 are wound over the narrow edge whereby the resistance encountered when the coils are wound is not excessive because of the reduced height of the flat conductors. However, this gives the finished coil 7 very great stiffness so that it forms a self-supporting component. Between each turn of the flat conductors 9, there is furthermore arranged turn insulation 11, which consists of a carrier provided with a hardenable synthetic resin. The carrier can be made, for example, of a paper-like fiber structure of aromatic polyamide. Through the setting of the synthetic resin contained in the turn insulation 11, the stiffness of the coil 7 is greatly increased still further.

Two mounting assemblies 12 arranged only at respective end-faces of the pole 2 are provided for fastening the two coils 7 which lie radially on top of each other. Each mounting assembly 12 includes a bracket 13 connected to the end-plate 4. A carrier 14 is attached to the bracket 13 by means of an intermediate piece 15. The width of the carrier 14 corresponds to the width of the coils 7, the lower one of which rests on the carrier 14. A band of sheet metal 16 now goes around the lateral surfaces of the coils 7 and is in turn fastened at the carrier 14. Because the coils 7 are provided only with turn insulation 11 arranged between the individual turns of the flat conductors 9, but not with an outer insulation, there is further arranged insulation 17 which surrounds the coils 7 on the outside, under the bands 16 or the mounting assembly 12. These two mounting assemblies 12 which are arranged only at the end-faces 3 of the poles 2, are sufficient to secure the excitation winding mechanically in low-speed synchronous machines.

In this connection, the position of the mounting assembly 12 relative to the end-plates 4 is chosen so that a space 18 is left between the inside surfaces of the coils 7 and the poles 2.

The coils 7 of the excitation winding 6 therefore lie completely exposed in the pole gaps, without any outer insulation, in the stream of the air flowing there. The air thus removes directly the dissipation heat generated in the coils 7 during the operation of the machine through the outside surfaces of the coils 7. To increase the cooling surface area, the flat conductors 9 may be provided here with a profile defining a cool fin 19 at the narrow faces not facing each other of the two coils 7 which are arranged radially on top of each other. If the excitation winding 6 consists of only a single coil 7, the cooling fins 19 may also be provided at both narrow faces of the flat conductor 9.

Low-speed synchronous machines for which the excitation winding arrangement according to the invention is suitable typically operate in the rpm range of about 100 to 1 rpm.

What is claimed is:

1. In an electric synchronous machine operable at low rotational speed equipped with a rotor having salient, shoeless poles for accommodating the excitation winding of an excitation winding arrangement thereon, each two mutually adjacent ones of the poles defining a pole gap therebetween through which air flows when the rotor rotates, the excitation winding arrangement comprising: at least one coil defining the excitation winding at a given pole, each of said coils being wound from a flat conductor with the flat sides thereof extending parallel to the walls of the pole whereby a coil of sufficient stiffness is obtained to constitute a self-supporting component, each of said coils having only turns insulation for electrically insulating the turns one from the other; and, mounting means connected at the end-faces of the rotor for holding said coils only at said end-faces and for supporting said coils in surrounding spaced relation to the poles, thereby completely exposing the exterior surfaces of said coils to the air flowing in the pole gaps.

2. The excitation winding arrangement of claim 1, said mounting means being connected at the end-faces of the pole.

3. The excitation winding arrangement of claim 2, said mounting means being configured so as to support said coils in spaced relation to the pole.

4. The excitation winding arrangement of claim 2, said mounting means comprising mounting assemblies arranged at respective end-faces of the pole, each of said mounting assemblies including a bracket mounted to the corresponding pole end-face, and a band surrounding said coils in insulating relation thereto and connected to said bracket.

5. The excitation winding arrangement of claim 4 wherein the pole is equipped with end-plates at respective end-faces thereof, said brackets being mounted to said end-plates.

6. The excitation winding arrangement of claim 2 comprising synthetic resin contained in said turns insulation and hardened therein after said coil is wound to impart thereto additional strength.

7. The excitation winding arrangement of claim 2, said wound flat conductor having a narrow edge portion defining an end-face of the corresponding coil, said edge portion having a profile configured so as to define a cooling fin.

8. The excitation winding arrangement of claim 2, said coils being two in number and disposed in insulated relation to each other with one coil on top of the other coil in the radial direction of the rotor, said mounting means comprising mounting assemblies arranged at respective end-faces of the pole for securely holding said coils in common.

* * * * *